United States Patent Office 3,383,397
Patented May 14, 1968

3,383,397
3-AMINO-2-HYDROXYPROPYL ESTERS AND METHODS FOR PREPARING THE SAME
John Edward Milks and Robert Dally Dworkin, Stamford, Conn., assignors to Arizona Chemical Company, New York, N.Y., a corporation of Delaware
No Drawing. Filed Jan. 14, 1965, Ser. No. 425,606
11 Claims. (Cl. 260—404)

The present invention relates to novel amino esters and to methods for their preparation. More particularly, it relates to a 3-amino-2-hydroxypropyl ester of fatty acids, or mixtures of such acids, whose α-carbon atom is unbranched as well as salts thereof. It has as its principal object the provision of amino esters and their addition salts, hereinbelow prepared and defined, which are useful as effective antibacterial agents.

In summary, the amino esters of the present invention can be represented by the structure:

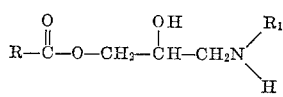

where R is an α-carbon unbranched alkyl substituent and, preferably, containing from one to twenty-two carbon atoms and $R_1$ is an α-carbon branched moiety, such as cycloalkyl or aryl. In general, the amino esters of the present invention can be prepared by reacting in substantially equimolar proportions a glycidyl ester of organic acid whose α-carbon is unbranched with a primary amine containing an α-carbon branched chain moiety in accordance with the following equation:

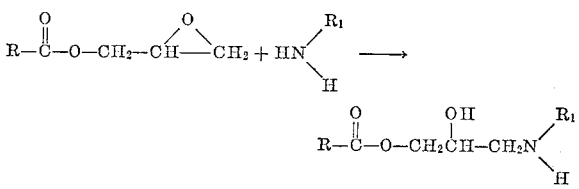

where R and $R_1$ are the same as defined above. Although equimolar proportions can be used, a molar excess of from 100% to about 300%, or more, of the amine is preferably employed to obtain maximum yields of desired product.

Illustrative glycidyl esters of organic acids containing α-carbon unbranched chain moieties are: glycidyl acetate, glycidyl n-propionate, glycidyl n-butyrate, glycidyl sec-butyrate, glycidyl 3-methylheptanoate, glycidyl n-decanoate, glycidyl laurate, glycidyl myristate, glycidyl stearate, glycidyl oleate, glycidyl ester of tall oi fatty acids, glycidyl ester of tall oil hydrogenated fatty acids, glycidyl ester of soya bean fatty acids and glycidyl ester of coconut fatty acids.

Exemplary of the primary amine reactants, as containing α-carbon branched chain moieties, are those characterized by an α-carbon branched chain moiety. These include cycloalkyl amines, such as cyclopropylamine, cyclobutylamine, cyclopentylamine, cyclohexylamine as well as arylamines, such as aniline and naphthylamine.

Salts of the ester amines are readily formed by reacting in substantially equimolar amounts such formed amines with any commercially available alkylating agent, such as dimethyl sulfate or benzyl chloride.

In general, the above reaction involving the glycidyl ester and the amine may be carried out at temperatures ranging from about 20° C. to about 150° C., and, preferably, from about 60° C. to about 100° C., for from about one to about ten hours. The ester amine reaction is conducted either under atmospheric pressure or super-atmospheric pressure. The latter pressure is created by utilizing a closed autoclave to develop at least autogenous pressure.

The invention will be further illustrated by the following examples. These are merely illustrative and are not to be taken as limitative of the invention. Unless otherwise stated, the parts are by weight.

EXAMPLE 1

A solution of 17 parts of glycidyl stearate, 14.9 parts of cyclohexylamine and 34 parts (by volume) of acetonitrile is heated under reflux for six hours. Upon cooling the solution, a solid precipitated. Resultant precipitate is next washed with acetonitrile. There is obtained 14.9 parts of 3-cyclohexylamino-2-hydroxypropyl ester of stearic acid, having a melting point between 74° C. and 76° C. The ester is further characterized by the presence of ester amine carbonyl absorption at 1730 cm.$^{-1}$ to the exclusion of amide carbonyl absorption bands as determined by infrared spectroscopy.

EXAMPLE 2

Repeating Example 1 in every detail except that 22.7 parts of glycidyl stearate, 18.7 parts of aniline and 44 parts of acetonitrile are reacted to yield 3-anilino-2-hydroxypropyl ester of stearic acid having a melting point of 47° C.–48° C. Resultant ester amine is characterized by ester carbonyl absorption at 1730 cm.$^{-1}$ and a band at 1600 cm.$^{-1}$ for aromatic absorption. No amide carbonyl absorption was present as determined by infrared spectroscopy.

EXAMPLE 3

Repeating Example 2 in every detail except that there is employed glycidyl tall oil fatty acid ester in lieu of glycidyl stearate, 3-anilino-2-hydroxypropyl ester of tall oil fatty acids is obtained in good yield.

EXAMPLE 4

The benzyl chloride and dimethyl sulfate addition salts were prepared from each of the compounds by reacting equimolar quantities of the benzyl chloride and dimethyl sulfate, respectively, with the ester amines prepared in each of the above examples.

EXAMPLE 5

To demonstrate the antibacterial activity of the amino esters and the acid addition salts thereof, the following is presented.

The agar streak method for assaying antibiotic activity as described in Industrial and Engineering Chemistry, Analytical edition, 17, page 556 (1945) by S. A. Waksman is employed to test each of the compounds prepared in the above examples. It is found that they are effective against the following organisms by inhibiting their growth: *Mycobacterium smegmatis* (ATCC 607), *Staphylococcus aureus* (ATCC 6538P) and *Bacillus subtilis* (ATCC 6633). The concentration of the test compound employed is 500 parts per million, or less.

What we claim is:

1. A compound selected from the group consisting of amino ester of the structure:

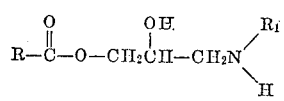

where R is an α-carbon unbranched alkyl substituent of from 1 to 22 carbon atoms and $R_1$ is an α-carbon branched selected from the group consisting of cycloalkyl of from 3 to 6 carbon atoms, phenyl and naphthyl, and the dimethylsulfate and benzyl chloride acid addition salts thereof.

2. The compound: 3-cyclohexylamino-2-hydroxypropyl ester of stearic acid.

3. The compound: dimethyl sulfate salt of 3-cyclohexylamino-2-hydroxypropyl ester of stearic acid.

4. The compound: 3-anilino-2-hydroxypropyl ester of stearic acid.

5. The compound: benzyl chloride salt of 3-cyclohexylamino-2-hydroxypropyl ester of stearic acid.

6. A process for preparing an amino ester of the structure:

$$R-\overset{O}{\overset{\|}{C}}-O-CH_2\overset{OH}{\overset{|}{C}H}-CH_2N\overset{R_1}{\underset{H}{\diagup}}$$

where R is an α-carbon unbranched alkyl substituent of from 1 to 22 carbon atoms and $R_1$ is an α-carbon branched selected from the group consisting of cycloalkyl of from 3 to 6 carbon atoms, phenyl and naphthyl which comprises the steps of: reacting at a temperature from about 20° C. to about 150° C. and for a time ranging from about 1 hour to about 10 hours in at least equimolar proportions (a) a glycidyl ester of the structure:

$$R-\overset{O}{\overset{\|}{C}}-O-CH_2-\overset{O}{\overset{\diagup\diagdown}{CH-CH_2}}$$

where R is as defined above with (b) a primary amine of the structure:

where $R_1$ is as defined above, and recovering said ester amine in good yield and purity.

7. The process of claim 6 wherein the glycidyl ester is stearic acid and the amine is cyclohexylamine.

8. The process of claim 6 wherein the glycidyl ester is stearic acid and the amine is aniline.

9. The process of claim 6 wherein the amino ester prepared therein is further reacted with an alkylating agent selected from the group consisting of dimethyl sulfate and benzyl chloride to prepare the corresponding addition salt of said amino ester.

10. The process of claim 9 wherein the alkylating agent is dimethyl sulfate.

11. The process of claim 9 wherein the alkylating agent is benzyl chloride.

References Cited

UNITED STATES PATENTS

| | | | |
|---|---|---|---|
| 3,217,018 | 11/1965 | Pollitzer | 260—404.5 |
| 3,272,712 | 9/1966 | Kalopissis et al. | 260—404 X |
| 3,290,304 | 12/1966 | Kalopissis et al. | 260—404 X |

NICHOLAS S. RIZZO, *Primary Examiner.*

ALEX MAZEL, *Examiner.*

F. A. MIKA, *Assistant Examiner.*